United States Patent [19]

Aikins et al.

[11] Patent Number: 5,690,260
[45] Date of Patent: Nov. 25, 1997

[54] BICYCLE CARRIER

[76] Inventors: Warren A. Aikins; James A. Aikins, both of P.O. Box 748, Rainier, Oreg. 97048

[21] Appl. No.: 557,450

[22] Filed: Nov. 14, 1995

[51] Int. Cl.$^6$ ............................. B60R 9/00; B60R 9/06
[52] U.S. Cl. .................. 224/505; 224/504; 224/521; 224/532; 224/924; 280/506
[58] Field of Search ......................... 224/924, 521, 224/532, 503, 504, 505, 506, 507, 508; 280/506

[56] References Cited

U.S. PATENT DOCUMENTS

| | | |
|---|---|---|
| 3,343,736 | 9/1967 | Sellers .................................. 224/505 |
| 5,169,042 | 12/1992 | Ching ................................... 224/924 |
| 5,244,133 | 9/1993 | Abbott et al. ....................... 224/924 |
| 5,370,285 | 12/1994 | Steelman ............................ 224/504 |
| 5,469,998 | 11/1995 | Van Dusen et al. .................. 224/508 |

*Primary Examiner*—Linda J. Sholl
*Attorney, Agent, or Firm*—Eugene M. Eckelman

[57] ABSTRACT

A bicycle carrier has a body member which is tubular in shape and size to have a telescoped connected fit in a tubular vehicle hitch member. A pivot support is provided at a rearward portion of the body member and pivotally supports an upright bicycle support post. Pivot support for the post is between an upright bicycle loaded position and a rearward tilted bicycle loading and unloading position that allows a tailgate for a rear door of a vehicle to be opened. Cooperating cam and a cam follower is connected between the upright support post and are driven by a turnbuckle assembly to provide a firm compressive contact between the body member and a vehicle hitch member when the bicycle support post is pivoted to its upright position whereby to provide a tight rattle-free support of the upright bicycle support post on the pivot. The cam and cam follower can also be tightened to the extent to provide a theft-proof connection. A rear extension may be provided on the body member that includes a hitch for pulling a trailer or the like behind the carrier.

13 Claims, 3 Drawing Sheets

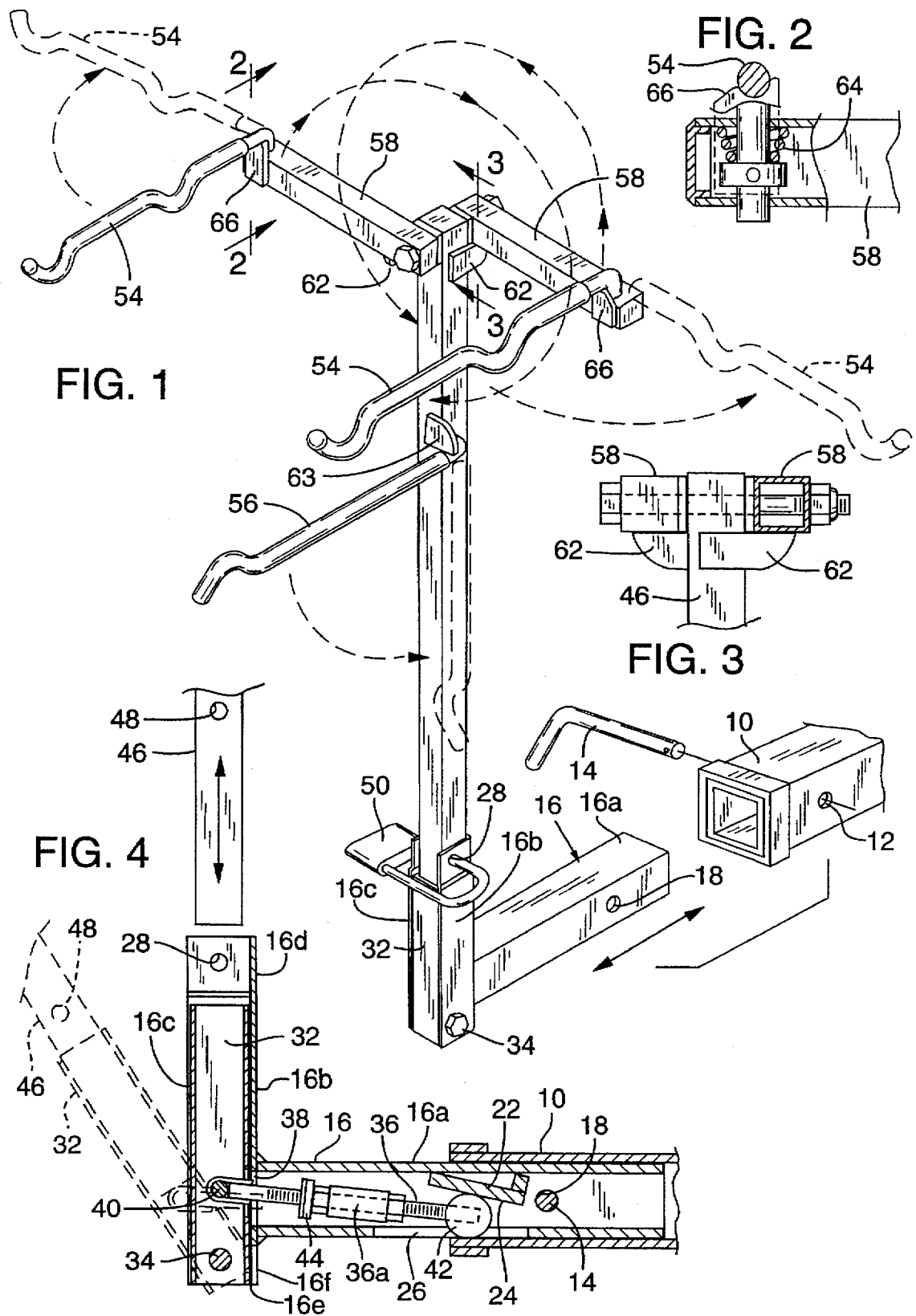

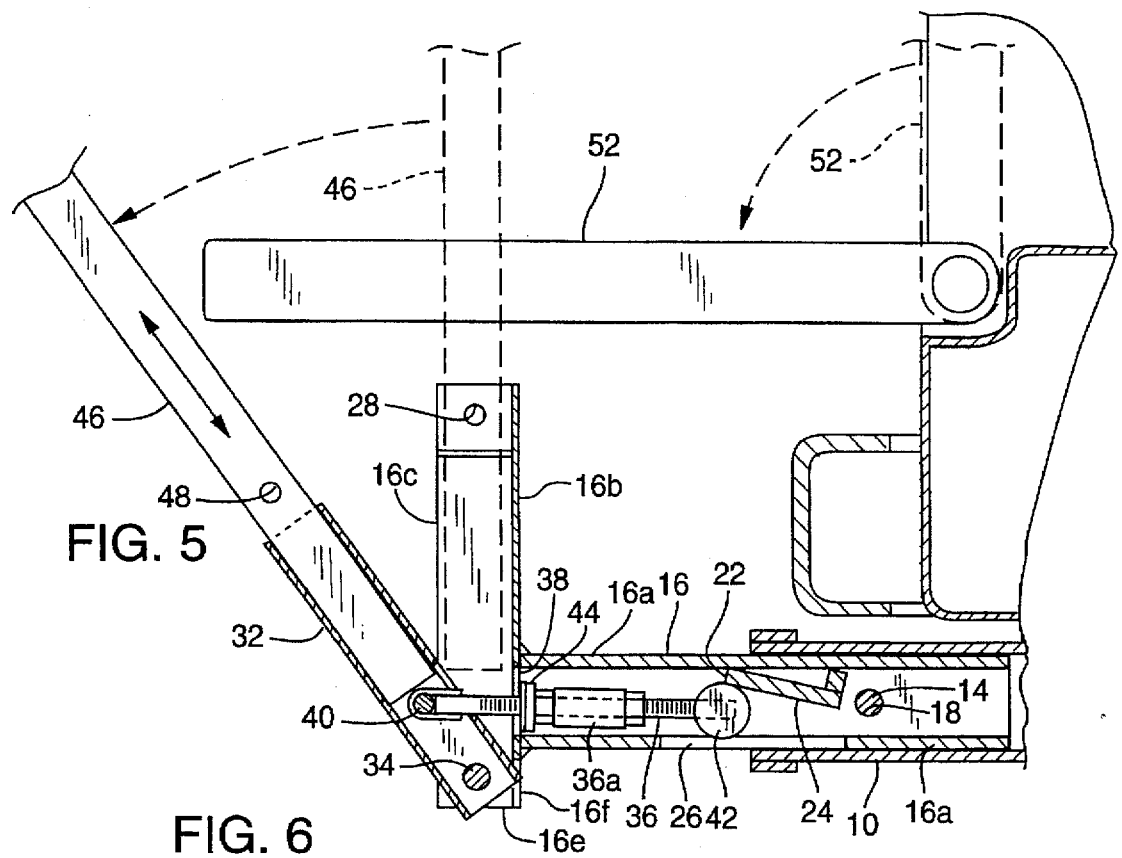
FIG. 5
FIG. 6
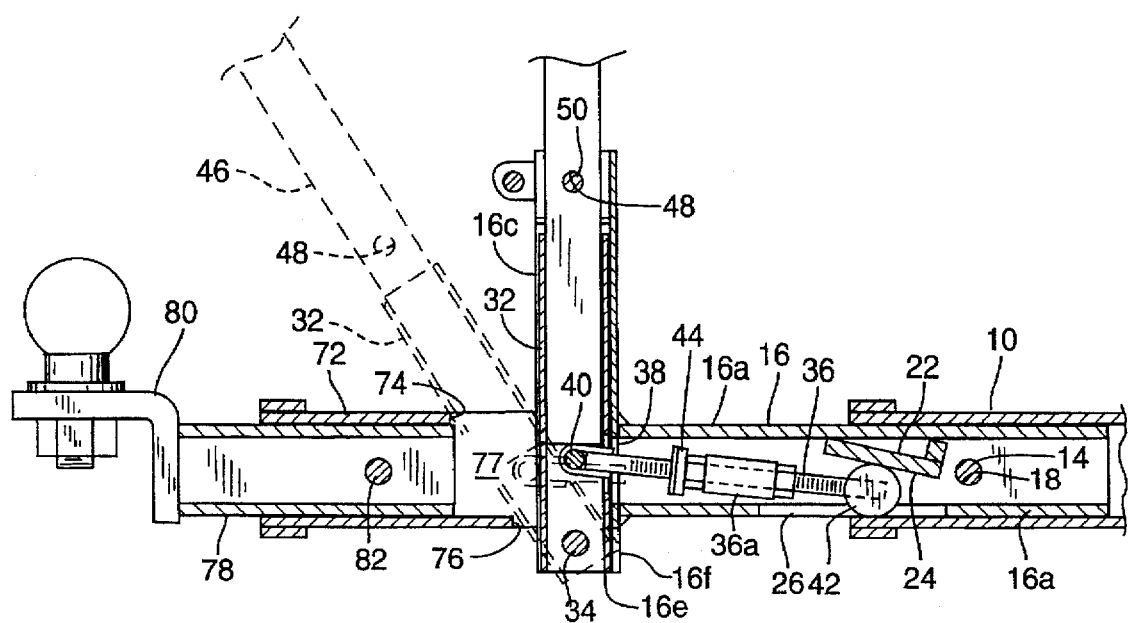

BICYCLE CARRIER

BACKGROUND OF THE INVENTION

This invention relates to new and useful improvements in bicycle carriers for vehicle trailer hitches of the type employing a tubular socket receiver.

Various types of carriers have been devised for the purpose of transporting bicycles on vehicles. Some forms of carriers currently used are supported in a hitch of the type employing a tubular socket receiver. One common fault of carriers of this type is that they are readily subject to theft unless special and cumbersome deterrent mechanism is used. Another common fault is that the carriers rattle and bounce when the vehicle is traveling on the road. Still another fault is that bicycle carriers do not have universal use on vehicles of the type having a rear tubular socket receiver since they do not make provision for vehicles of a type having a tailgate or rear door that swings out or down.

SUMMARY OF THE INVENTION

A primary object of the invention is to provide a bicycle carrier for vehicles of the type having a tubular socket receiver and wherein said carrier has internal locking structure that is extremely difficult to wrongfully remove from the receiver and that is automatically applied upon folding a bicycle support portion to its upright bicycle carrying position, and also that in such upright position compresses parts of the carrier together for stabilizing its parts and for preventing rattling. Another object is to provide a bicycle carrier that can be pivoted downwardly sufficiently to allow a tailgate or rear door to open.

In carrying out the objects of the invention, the present carrier comprises a tubular body member of a shape and size providing a telescoping support fit in the usual tubular type socket receiver of a trailer hitch. Pivot support means are provided at the rearward portion of the body member for pivotally supporting an upright bicycle support post for pivoted movement between a substantially vertical bicycle loaded position and a rearwardly tilted bicycle loading and unloading position. Cooperating cam and cam follower means are operably connected between the upright support post and a forward portion of the body member, such cam and cam follower means being driven into a firm compressive contact between the body member and a vehicle hitch member when the bicycle support post is pivoted to its upright position for providing a tight, theft-proof and rattle free support of the upright bicycle support post on the pivot support. The cam and cam follower means include a length adjustable longitudinal connector extending between the upright bicycle support post and the cam follower means, such length adjustment providing proper firm compressive contact of the cam follower and the cam surface in the upright position of the bicycle support post. Bumper means are provided on the longitudinal connector which limits rear tilted movement of the bicycle support post in its rearward tilted position. The carrier has an integral upright body portion which provides a locking body portion for the upright bicycle support post in its upright position to prevent theft of the upright bicycle support post. The carrier may have a trailer hitch portion as a rear extension thereof.

The invention will be better understood and additional objects and advantages will become apparent from the following description taken in connection with the accompanying drawings.

BRIEF DESCRIPTION OF THE DRAWINGS

FIG. 1 is a rear perspective view of the bicycle carrier of the invention showing its association with the tubular socket receiver of a towing vehicle and also showing the carrier in an upright bicycle support position, this view showing in broken lines folding steps of bicycle support arms.

FIG. 2 is a sectional view taken on the line 2—2 of FIG. 1 and detailing a bicycle support arm in a folding function.

FIG. 3 is a fragmentary elevational view showing a central support for upper arm fold means.

FIG. 4 is a vertical sectional view of the body member for the upright bicycle support post.

FIG. 5 is a view taken similar to FIG. 4 but showing the carrier with its bicycle support post in full lines and tilted rearwardly so that a tailgate of a vehicle can swing down.

FIG. 6 is a vertical sectional view of an embodiment of the invention wherein the carrier of the invention is combined with a trailer hitch at the rear thereof.

DETAILED DESCRIPTION OF PREFERRED EMBODIMENTS

Figure 7:
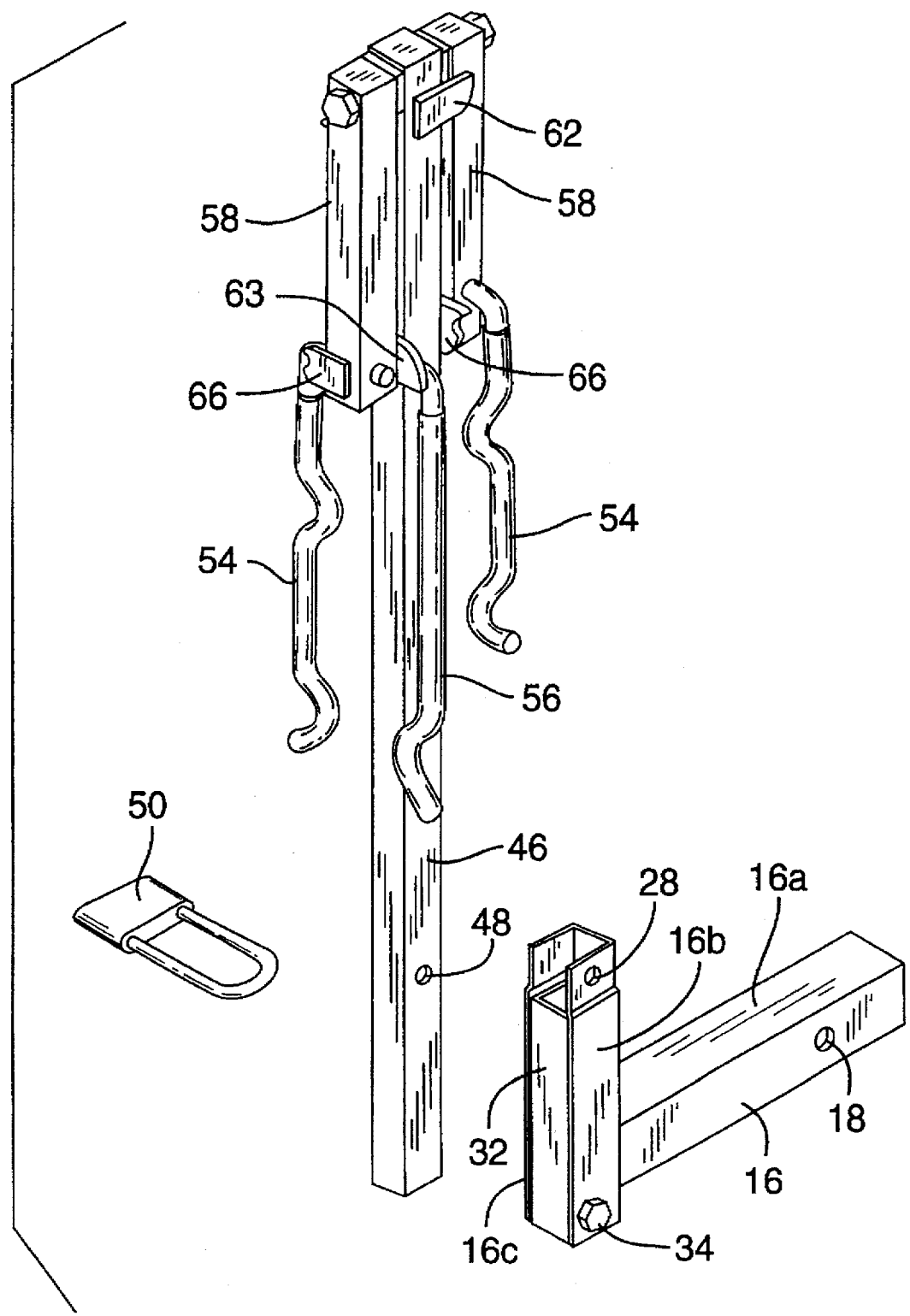
FIG. 7 is an exploded view showing the carrier removed from the vehicle and disassembled and folded for storage.

With particular reference to the drawings, the numeral 10 designates a conventional tubular trailer hitch socket receiver of the type that is welded to a rearward portion of a towing vehicle. These receivers include an aperture 12 for receiving a lock pin or bolt 14 and fastening the trailer hitch portion to the receiver.

The present invention comprises a right angle body member 16 one leg 16a of which is a tubular member that fits within the receiver 10 and has an aperture 18 that lines up with the aperture 12 in the receiver to receive the pin 14. A cam or ramp member 22 is integral with an interior wall of the body member, such as the upper wall of the horizontal leg 16a, and has a cam or ramp surface 24 facing the opposite interior surface of the leg 16a rearwardly of aperture 18. Such opposite surface has an opening 26 cut therein which is opposite from the cam surface.

The leg 16b of the body member is channel-shaped with the opening face 16c of the channel facing rearwardly. The upper end of the leg 16b has an extension 16d that is narrowed across the open portion of the channel, this narrowed portion having a holding and locking aperture 28 thereacross.

Contained within the channel-shaped upright leg 16b is a tubular base socket 32 pivotally connected to a bottom extension 16e of the body member leg 16b. The pivot support for the base socket 32 comprises a cross pin 34 in the bottom extension 16e. The bottom end of the extension 16e is open and the front wall of this same extension is cut out at 16f, best seen in FIGS. 4 and 5, to allow pivot movement of the base socket to a rearwardly angled position shown in broken lines in FIG. 4 but in full lines in FIG. 5.

A longitudinal connector 36 with a turnbuckle assembly 36a therein is contained within the horizontal leg 16a of the body member and has one end projecting through openings 38 in the leg 16b and in the base socket 32. This end of the connector has pivot attachment to a cross pin 40 wherein the turnbuckle assembly can lengthen or shorten the connector.

The opposite end of the connector 36 carries an integral cam follower 42 arranged in an upright pivoted position of the base socket 32 to be driven into firm engagement with the cam surface 24. When the base socket is pivoted counterclockwise, the cam follower retracts from the cam surface. In a preferred structure, the cam follower 42 is cylindrical, and its axis is laterally across the sloping surface. Opening 26 is large enough laterally to receive the cam follower, whereby the cam follower is engageable with the receiver 10. As will become more apparent hereinafter, cam follower 42 can be adjusted by the turnbuckle such that in the upright position of the socket member 32, the latter is held tightly against rattling and the cam can simultaneously serve a locking function as well, to be described. Turnbuckle assembly 36a includes a cushioned rear stop nut 44 that is adjustably movable on the turnbuckle so as to abut against the leg 16b in the tilted position of the latter and control the rearward tilt of the socket 32, FIG. 5. Openings 38 in the body member 16d and base socket 32 are of less width than the stop nut 44 to provide a surface of abutment for the stop. Turnbuckle assembly 36a allows for adjustment of the stop nut and the cam follower 42 for proper operation in their individual functions.

Base socket 32 receives a lower portion of a bicycle carrier support post 46 which has a cross aperture 48 located such that when the post 46 is inserted and seated on the framed cross pin 40, the aperture 48 will align with the aperture 28 in the upright leg 16 of the body member. The base socket 32 and bicycle carrier support post 46 together form an upright bicycle support post which is pivotally connected to upright leg 16b of the body member. The post can thus be secured in place by a suitable cross pin, not shown, or locked by locking pin or a padlock 50. The narrower lateral width of the post 46 fits relatively snugly between the narrowed sides of extension 16d. Upon release of a locking device 50 from the apertures 28 and 48, the post can be pivoted rearwardly to the FIG. 5 position to allow a tailgate or rear door 52 of the towing vehicle to be opened.

The carrier support post 46 has a pair of support arms 54, FIGS. 1 and 7, on which one or more bicycles may rest. A lower tie down arm 56 is provided for holding the bicycles down. Tie down may be by appropriate means such as elastic cord or the like. Also, suitable bicycle lock or locks may be employed.

With particular reference to FIGS. 1, 2, 3 and 7, the rearwardly extending arms 54 are foldably supported on laterally extending arms 58 which also can fold whereby to compact the carrier support portion for storage. Lateral arms 58 have pivoted support at an upper portion of the post and rest on post abutments 62 secured on the same side of the post at which the arms extend. Arms 58 can be folded parallel with the post by rotating them in the direction away from the abutment 62. Arms 54 can also be folded relative to their support arms 58 by rotating them outwardly to extend parallel with the arms 58, as seen in broken lines in FIG. 1 whereby to also lie parallel against the post 46 when the arm 58 is rotated away from the abutment 62. Arms 54 are movable and held in their rearward position by pivoted spring loaded extensions 64 of the arms 58 that have association with cam projections 66. These cam projections require frictional movement of the arms thereover in their folding movements from one position to the other, thus holding the arms steady in rearwardly directed relation. Arm 56 has a pivot connection with the post 46 and is associated with an abutment 63 which limits upward rotation of the arm 56. The pivot connection of the arm 56 with the post is preferably tight in order to hold this arm up but foldable against the post when desired.

FIG. 6 illustrates the combination of the present bicycle support mechanism with a secondary tubular socket receiver 72 which can be used to pull a trailer or the like behind the bicycle carrier. For this purpose, the tubular socket receiver 72 is of similar structure as the member 10 and has upper and lower slots 74 and 76, respectively, that form straddling walls 77 on a portion of the body member 16. These walls can be welded to the body member. Slots 74 and 76 terminate at the rearward portion of the receiver such as to allow rear tilted movement of the base socket 32. Associated with the receiver 72 is the tubular portion 78 of a trailer hitch 80 that fits snugly within the receiver 72 and is capable of receiving a cross pin 82 similar to pin 14 for connection of these two parts.

According to the present invention, a first feature of the invention is that the cam follower 42 is adjustable by the turnbuckle assembly 36 such that it has proper engagement with the cam surface 24 and the tubular socket receiver 10. By proper adjustment of the turnbuckle assembly, the cam follower can be made to engage the cam surface fairly tightly at the time that the base socket 32 reaches its fully upright position, as in FIG. 4. In fact, adjustment is desired such that in the fully upright position of the socket member 32, a bite or impression is made in the cam follower surface so that it not only eliminates any rattles between the upright socket 32 and the tubular socket receiver 10 but also is firmly stuck and very difficult to back off even though the pin 14 has been removed. Thus, it is difficult for a thief to wrongfully remove the bicycle carrier from the hitch socket 10 by removing the pin 14 because unless the lock 50, which can be a padlock, is also broken off, merely removing the pin 14 nevertheless leaves the cam members frictionally engaged. Such comprises a double lock deterrent against theft. For the owner to remove the carrier or to tilt it rearwardly, the padlock 50 is removed and the leverage of the tall post 46 can be used to back off the cam lock, FIG. 5. Thus, by a single lock 50 the support post 46 for the bicycles can be locked and the bicycle carrier secured to the tubular socket receiver 10. The bicycle itself can be secured to the post 46 by means of a cable which can be threaded through lock 50. The lock 50 performs three locking functions, namely, it locks hitch 16 to the receiver 10, it locks the carrier 46 to the hitch 10, and locks the bicycle to carrier 46.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described the invention, we claim:

1. A carrier for bicycles for support on vehicles having a tubular hitch member, said carrier comprising:

a body member having forward and rearward end portions, said body member being tubular in shape and size on its outer dimensions to have a telescoped connected fit in a tubular vehicle hitch member, pivot support means at said rearward portion of said body member pivotally supporting an upright bicycle support post of said carrier for pivoted movement between an upright bicycle loaded position and a rearwardly tilted bicycle position, and cooperating cam and cam follower means connected between said upright bicycle support post and a forward portion of said body member, said cam and cam follower means being driven to provide a firm compressive contact between said body member and a vehicle hitch member when said upright bicycle support post is pivoted to its upright position for providing a tight rattle-free support of said upright bicycle support post on said pivot support means.

2. The carrier of claim 1 wherein said cam is attached to said body member and said cam follower is attached to said upright bicycle support post, and including a longitudinal connector engaging said cam follower, and length adjustment means in said connector for providing proper firm compressive contact of said cam follower and said cam surface in the vertical bicycle loaded position of the bicycle support post.

3. The carrier of claim 1 wherein said cam surface of said cam and cam follower means is attached to said body member and said cam follower is attached to said upright bicycle support post, and including a longitudinal connector between said upright bicycle support post and said cam follower, and length adjustment means in said connector for providing proper firm compressive contact of said cam follower and said cam surface in the vertical bicycle loaded position of the bicycle support post.

4. The carrier of claim 2 including an upright standard adjacent said upright bicycle support post, and bumper means on said longitudinal connector limiting rear tilted movement of said upright bicycle support post in its rearward tilted position.

5. The carrier of claim 2 wherein said longitudinal connector comprises a threaded connecting rod and said length adjustment means comprises a turn buckle.

6. The carrier of claim 3 including an opening in a wall of said tubular body member adjacent said cam follower, said cam surface being mounted on an opposite wall of said tubular member from the opening, said cam follower in the firm compressive contact with said cam surface projecting through said opening for contact with the hitch member on a vehicle.

7. The carrier of claim 1 including an upright standard adjacent said upright bicycle support post, said standard being integrally attached to said body member, and lock means on said standard and on said upright bicycle support post which provide means for locking said upright bicycle support post to said standard in the upright position of said upright bicycle support post wherein to prevent theft of said upright bicycle support post.

8. The carrier of claim 1 including a rear extension on said body member comprising a hitch member for pulling a trailer behind the carrier.

9. The carrier of claim 1 wherein said cam and cam follower means is driven to provide a firm compressive contact between said body member and vehicle hitch member when said bicycle support post is pivoted to its upright position for additionally achieving a theft-proof support.

10. The carrier of claim 1 including lock means on said upright bicycle support post for locking the carrier on the hitch member of a vehicle when the bicycle load post is pivoted to its upright support load position.

11. The carrier of claim 10 wherein said lock means comprises a lock that is capable of locking said upright bicycle support post in its upright position.

12. The carrier of claim 11 wherein said lock includes an upright standard integral with said body member to which said upright bicycle support post can be locked.

13. The carrier of claim 10 wherein said bicycle support post includes support arms for holding a bicycle, said support arms having multiple axis folding portions providing a compact folded storage condition of said upright posts and support arms.

* * * * *